United States Patent
Chang et al.

(10) Patent No.: US 8,344,703 B2
(45) Date of Patent: Jan. 1, 2013

(54) VARIABLE ON-TIME CONTROL METHOD FOR HIGH LIGHT-LOAD EFFICIENCY, SMALL OUTPUT VOLTAGE RIPPLE, AND AUDIBLE-NOISE-FREE OPERATION

(75) Inventors: Chin Chang, Agoura Hills, CA (US); Veter Chang, Sijhih (TW)

(73) Assignee: Semtech Corporation, Camarillo, CA (US)

(*) Notice: Subject to any disclaimer, the term of this patent is extended or adjusted under 35 U.S.C. 154(b) by 493 days.

(21) Appl. No.: 12/716,173

(22) Filed: Mar. 2, 2010

(65) Prior Publication Data
US 2011/0215771 A1    Sep. 8, 2011

(51) Int. Cl.
*H02J 7/00*  (2006.01)
(52) U.S. Cl. .................. 320/166; 323/265; 323/271
(58) Field of Classification Search .......... 320/166; 323/265, 271, 282–285
See application file for complete search history.

(56) References Cited

U.S. PATENT DOCUMENTS
6,583,610 B2 * 6/2003 Groom et al. ............ 323/288
2003/0222633 A1 * 12/2003 Hwang .................... 323/282

OTHER PUBLICATIONS

"Datasheet LT3464, Micropower Boost Converter with Integrated Schottky and Output Disconnect in ThinSOT", Linear Technology Corporation, Jan. 2003 (pp. 1-16).
"Fundamentals of Power Electronics", Robert W. Erickson, et al., University of Colorado, Second Edition, 2001, Chapter 9 (pp. 331-375).

* cited by examiner

*Primary Examiner* — Samuel Berhanu
(74) *Attorney, Agent, or Firm* — O'Melveny & Myers LLP (57) ABSTRACT

An apparatus and method of controlling power converters is achieved that produces high light-load efficiency and reduced output voltage ripple while maintaining quiet operation that is free from audible noise. The inventive method includes a variable on-time control circuit that is applicable to a wide variety of switching mode converters, including, but not limited to, boost converters, buck converters, buck-boost converters, single-ended primary inductor (SEPIC) converters, and other converter topologies, both isolated and non-isolated.

13 Claims, 7 Drawing Sheets

VARIABLE ON-TIME CONTROL METHOD FOR HIGH LIGHT-LOAD EFFICIENCY, SMALL OUTPUT VOLTAGE RIPPLE, AND AUDIBLE-NOISE-FREE OPERATION

BACKGROUND OF THE INVENTION

1. Field of the Invention

The invention relates generally to the field of switching power converters, and more particularly, to control methods that enable power converters to achieve reduced output voltage ripple and high light-load efficiency while maintaining quiet operation, free from audible noise.

2. Description of Related Art

Figure 1:
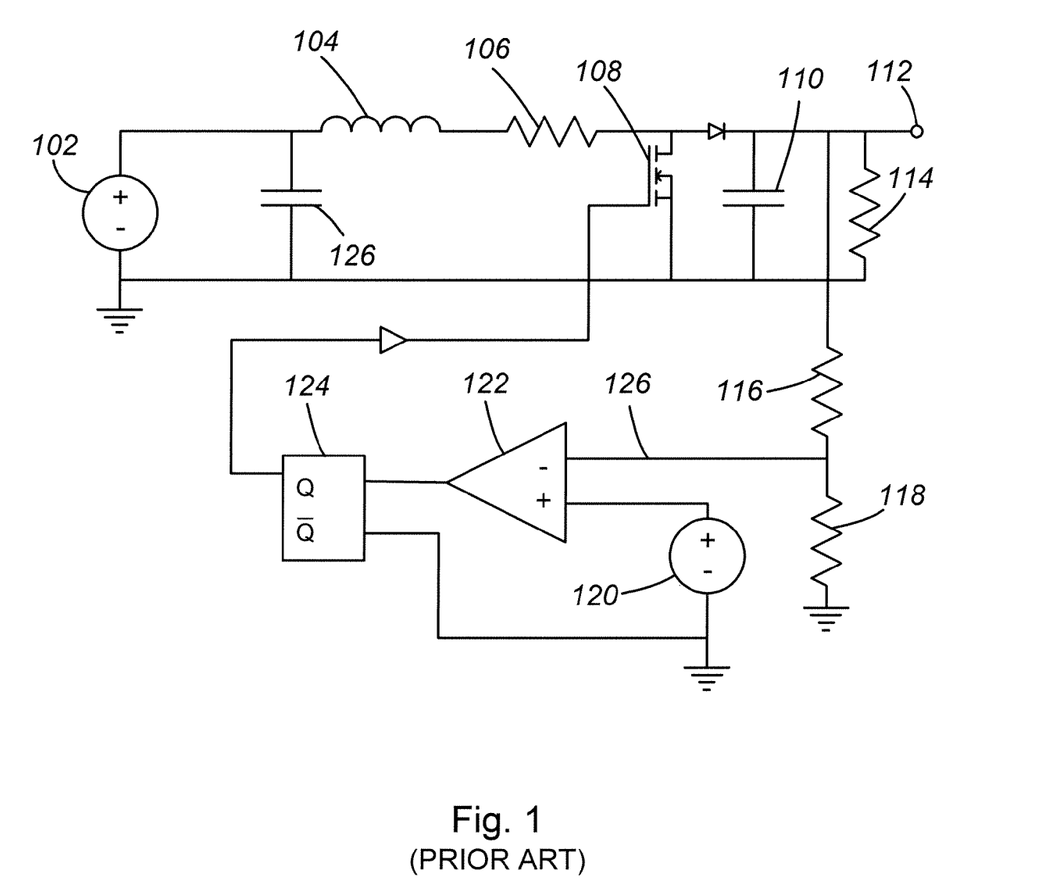
FIG. 1 is a depiction of a boost converter, typical of the prior art.

A switching power converter control system, typical of the prior art, can be characterized as constant on-time control. FIG. 1 is a simplified schematic of a boost converter employing constant on-time control. $V_{in}$ is the input voltage 102, and $V_o$ is the output voltage 112. The input inductor 104 has an equivalent series resistance (ESR) of $R_L$, represented by resistor 106. Under the constant on-time control method, the MOSFET 108 is turned on for a duration $T_{on}$, and then turned off for a duration $T_{off}$ that is determined by a feedback voltage that is developed by the resistive divider formed by resistor 116 and resistor 118. This feedback voltage 126 is routed to comparator 122, where it is compared with reference voltage 120. When the feedback voltage 126 is less than the reference voltage 120, flip flop 124 turns MOSFET 108 on for a time duration $T_{on}$. When the feedback voltage 126 rises above reference voltage 120, the MOSFET 108 is switched off. For a given load and given values of $V_{in}$ and $V_o$, the circuit operates in a steady state mode with frequency $f_s$ and period $T_s$, where $f_s=1/T_s$ and $T_{on}=D*T_s$, where D is a duty cycle ratio less than one. For an input inductor 104 having a value of L and a change in inductor current at MOSFET 108 turn on of $di_L$, the governing equation of the boost converter can be written as:

$$V_{in}*T_{on}=L*di_L=(V_o-V_{in})*T_{off}.$$

In steady state operation, when the boost converter operates in continuous conduction mode (CCM), $T_{on}+T_{off}=T$. However, in discontinuous conduction mode (DCM), $T_{on}+T_{off}<T_s$. From the equation above, it can be seen that for a given $V_{in}$ and L, if $T_{on}$ is fixed, $di_L$ will take on a fixed value. If the load current is reduced and the circuit enters DCM operation, the $T_{off}$ time will increase in order to maintain the regulation of the output voltage $V_o$ 112. When the load current is further reduced, the operating frequency of the circuit will decrease, reducing switching losses and improving efficiency under light load. When the load current approaches zero, the boost circuit under constant on-time control may maintain switching at a low frequency such as 5 kHz, or it may enter a hiccup mode, also known as a burst mode. When a regulator enters burst mode, it may produce audible noise and exhibit increased output voltage ripple.

Figure 2:
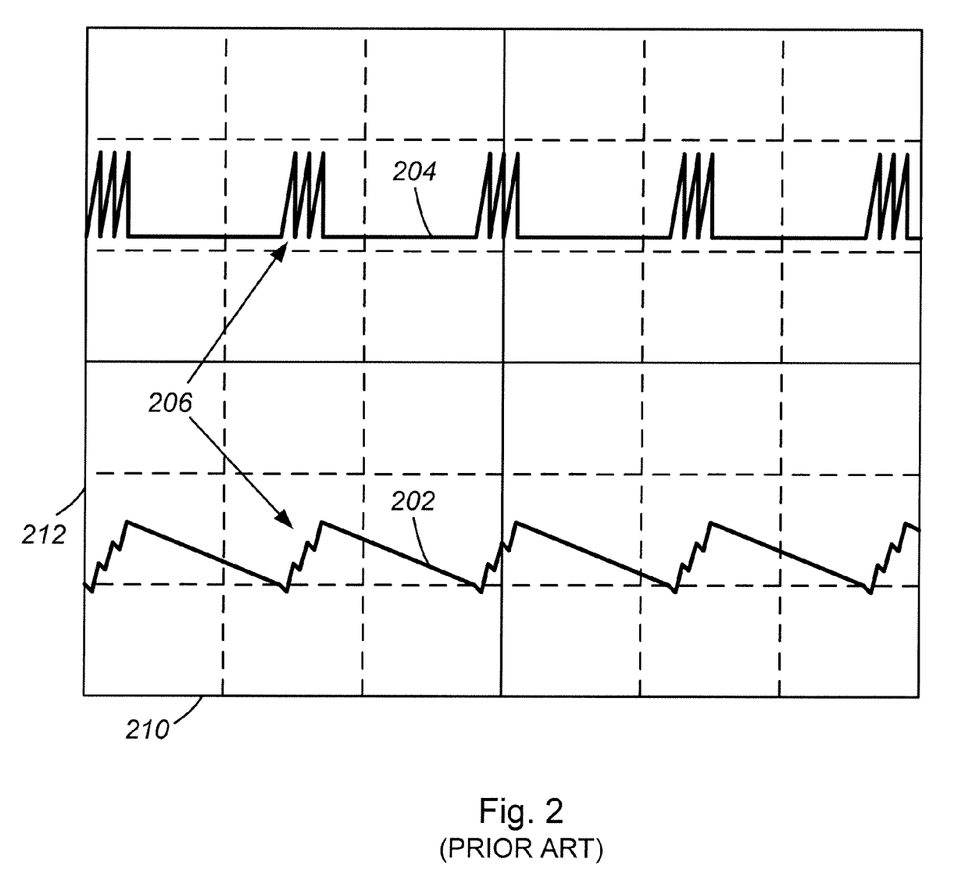
FIG. 2 is a representative waveform from a typical prior-art system using constant-off-time control that has entered burst mode due to a large drop in output load current.

As an alternative to constant on-time control, some systems of the prior art use a constant off-time control mode in conjunction with burst mode operation. In such systems, a fixed delay circuit maintains a constant $T_{off}$ time, while the on time changes as a function of the input and output voltages and the load. In either the constant-on-time or constant-off-time control systems, the typical inductor-current and output-voltage waveforms are pulsed, which improves efficiency, but has the drawback of increased output ripple and audible output noise. FIG. 2 illustrates the typical operation of a system using constant-off-time control that has entered burst mode due to a large drop in output load current. Time is plotted along horizontal axis 210. In this exemplary plot, the timescale is ten microseconds per division. The lower waveform 202 illustrates the output voltage, with the vertical axis 212 corresponding to one hundred millivolts per division. The upper trace 204 is the inductor current, plotted at 0.2 Amperes per division. Burst mode operation can be seen in both the current and voltage traces, for example at 206. This voltage ripple at the output and audible noise that may be produced may both be disadvantageous in many applications. Accordingly, it would be useful to produce a system that would remain free from such noise even under very low output-load current conditions.

SUMMARY OF THE INVENTION

An apparatus and method of controlling power converters is achieved that produces high light-load efficiency and reduced output voltage ripple while maintaining quiet operation that is free from audible noise. The inventive method is applicable to a wide variety of switching mode converters, including, but not limited to, boost converters, buck converters, buck-boost converters, single-ended primary inductor (SEPIC) converters, and other converter topologies, both isolated and non-isolated.

An embodiment of a variable on-time control system in accordance with the present invention is coupled with a switching power converter. A switching power converter receives an input voltage and outputs a load current at an output voltage. A primary switching element, such as a MOSFET, is responsible for synthesizing the output voltage, which is controlled by a feedback loop that adjusts the duty cycle of a pulse width modulator that drives the primary switching element.

An embodiment of the present invention provides a primary feedback circuit that includes a charge storage device, such as a capacitor, connected to a current source, which may be a resistor in series with the input voltage of the power converter. A bypass switch is provided in parallel with the charge storage device such that when the bypass switch is opened, the capacitor is charged by the current source. The voltage developed on the charge storage device is compared to a reference voltage using a differential amplifier or comparator. The output of the differential amplifier or comparator is used to turn off the primary switching element of the switching power converter once the voltage of the charge storage device exceeds the reference voltage.

However, the primary switching element can be turned off later or earlier than would be expected by the addition of one or more variable control circuits connected to the current source. A first variable control circuit adjusts the on time of the primary switching element in accordance with the load current and the output voltage of the switching power converter. A current sense voltage proportional to the bad current is scaled and compared in a differential amplifier with a scaled version of the power converter output voltage. The output of the differential amplifier is used to drive a transconductance amplifier, which may be a MOSFET, that is connected to the current source. Thus, as the load current increases, the transconductance amplifier shunts an increasing amount of current from the current source, slowing the charging rate of the charge storage device, and prolonging the time that the primary switching element stays on.

A second variable control element includes a second transconductance amplifier that is similarly connected to the current source but that has an input connected to the output voltage of the switching power converter. Thus, as the output voltage increases, the amount of current from the current source that is shunted through the second transconductance amplifier increases, and the charge rate of the charge storage device decreases, increasing the on time of the primary switching element.

It is preferable to include both the first and the second variable control elements in a switching power converter system in accordance with the present invention. However, systems that include only one of the above-described variable control elements would also fall within the scope and spirit of the present invention.

A minimum off-time circuit may further be added to the system in accordance with another embodiment of the present invention. The minimum off-time circuit includes a second charge storage device that is charged by a second current source, which may similarly be a resistor in series with the input voltage of the switching power converter. A bypass switch is disposed in parallel with the second charge storage device such that the second charge storage device charges through the current source when the bypass switch is opened. The voltage of the charge storage device is compared to a reference voltage. The output of the comparison circuit is used to hold the primary switching element of the power converter in the off state until the comparison circuit changes state, indicating that the voltage of the second charge storage device exceeds the reference voltage. This circuit thus ensures that the main switching element remains off for a minimum time period.

The variable on-time control system thus described maintains a relatively high switching frequency above the audible limit of about 25 kHz, although the precise value of this frequency limit could be adjusted or redefined. It also operates to reduce output voltage ripple and maintain high efficiency. Those skilled in the art will realize other applications and benefits of the invention described herein by a study of the detailed description below and the attached drawings, which will first be described briefly. Reference designators that appear in more than one drawing refer to common elements that appear in more than one drawing.

DETAILED DESCRIPTION OF THE PREFERRED EMBODIMENT

The present invention relates to an apparatus and method for controlling a switching converter to achieve high light-load efficiency while maintaining quiet operation free from audible noise. Output voltage ripple is also greatly reduced. The inventive method is applicable to a wide variety of power converter architectures, including boost, buck, buck-boost, SEPIC, and other topologies, both isolated and non-isolated.

Figure 3:
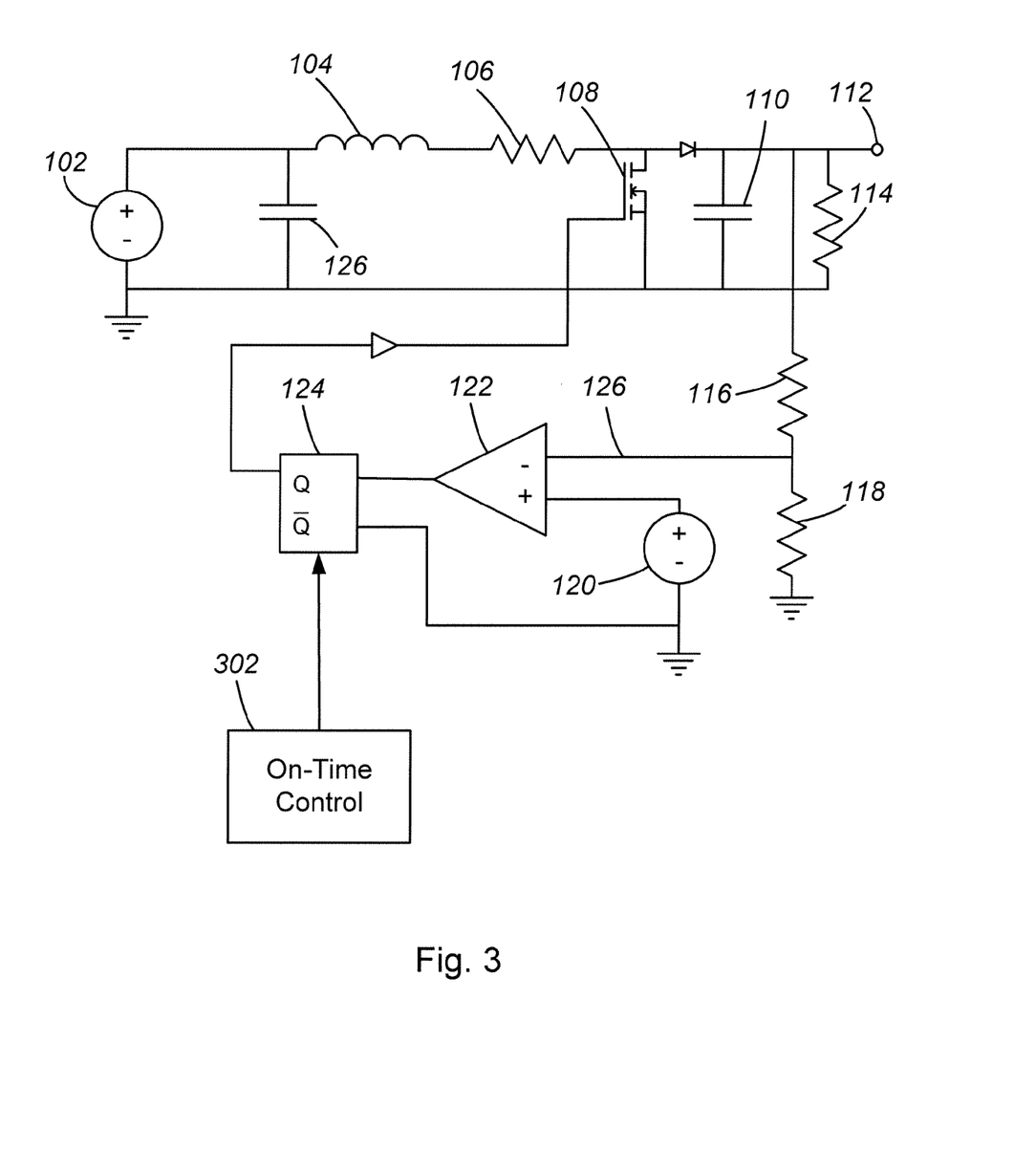
FIG. 3 is a conceptual drawing of a boost converter architecture in accordance with an embodiment of the present invention.

FIG. 3 is a conceptual circuit diagram illustrating a method of variable on-time control of a boost converter in accordance with an embodiment of the present invention. A boost converter similar to that of FIG. 1 is shown with an additional control block 302 that provides the ability to control the on-time of MOSFET 108 in a variable manner. In such a boost converter, the governing equation provides two possible ways in which the on-time-control block 302 may be used to provide variable on-time control. Manipulating the boost converter equation presented earlier, we can express the following relationship:

$$T_{on} = (L/V_{in}) * di_L$$

Figure 4:
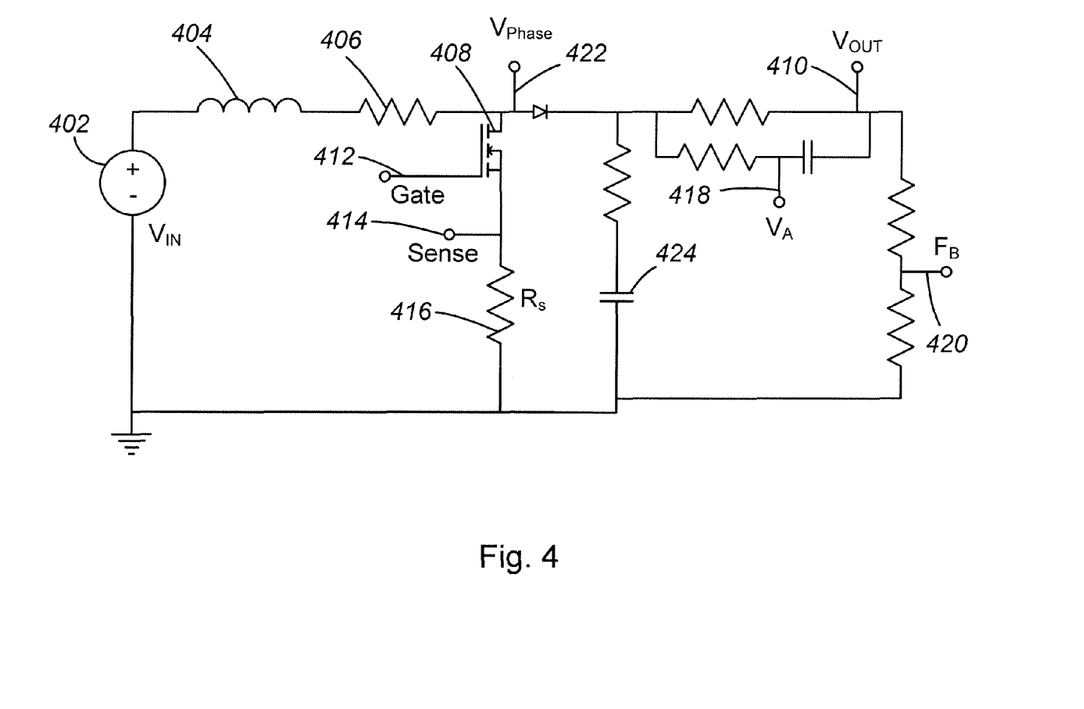
FIG. 4 is a more detailed circuit diagram of a portion of a boost converter in accordance with an embodiment of the present invention.

This relationship shows that the on-time is linearly related to $di_L$. FIG. 4 is a circuit diagram of a boost converter in accordance with an embodiment of the present invention that measures inductor current in order to control the switching FET on time. Input voltage 402 is applied through input inductor 404 having an ESR represented by resistor 406. MOSFET 408 is switched between an on and an off state by gate control input 412 in order to produce an output voltage 410. Sense resistor $R_s$ 416 is placed in the current path of the MOSFET 408. Sense voltage 414 thus provides an indication of inductor current, which can be used to control on time. In particular, sense voltage 414 is equal to the inductor current multiplied by Rs, and this can be used as a voltage threshold in the circuit controlling the switching state of the MOSFET 408. For example, in FIG. 3, the comparator 122 driving the flip flop 124 could be driven with sense voltage 414 as one input to create a variable on-time that is dependent on the inductor current.

Figure 5:
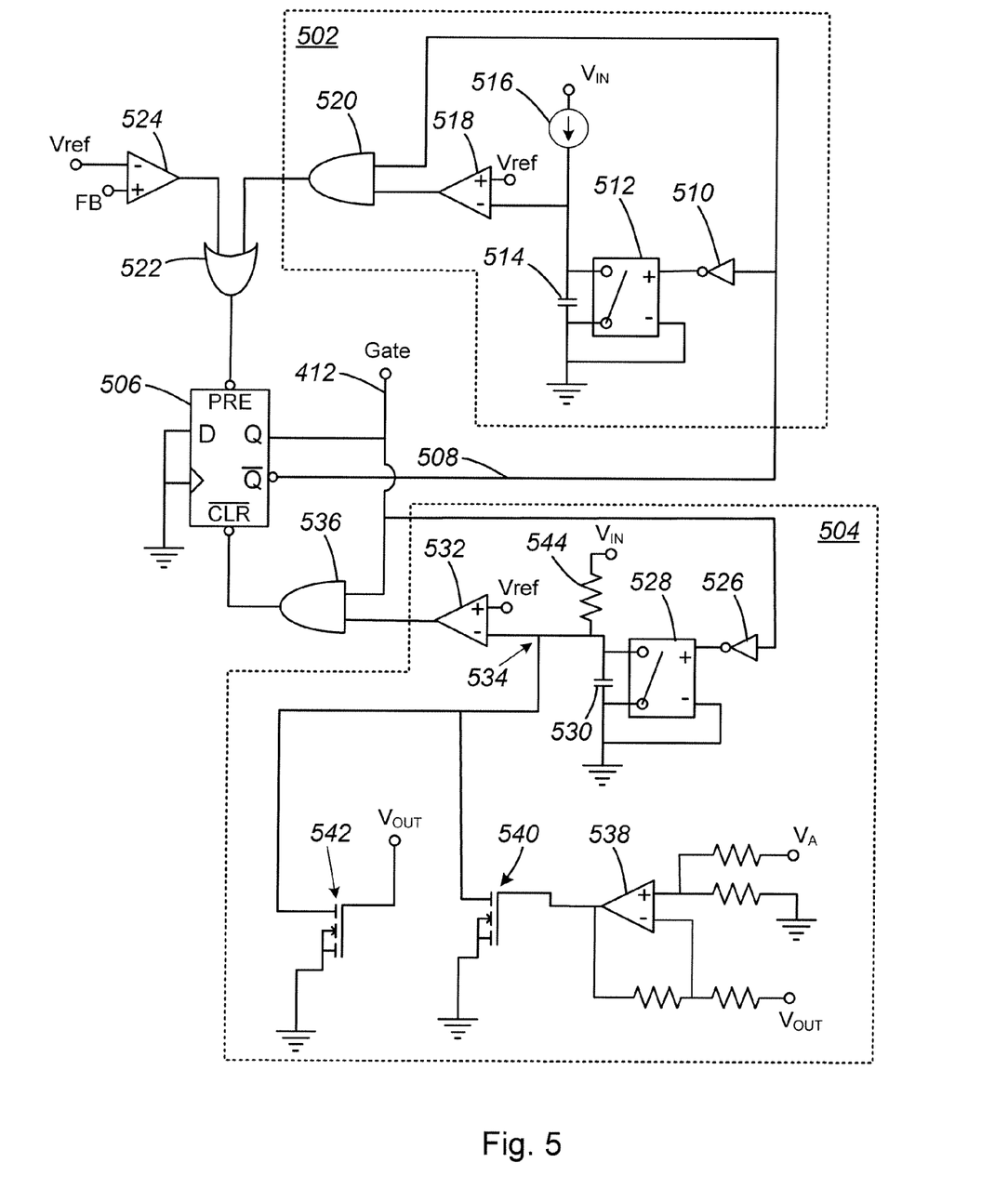
FIG. 5 is circuit diagram representing minimum off-time and variable on-time control circuits in accordance with an embodiment of the present invention.

FIG. 5 depicts an exemplary switching converter control system that achieves variable on-time control in accordance with an embodiment of the present invention. Referring back to FIG. 4, the output current $I_o$ sourced to the load via tap 410 is sensed by voltage $V_A$ indicated at tap point 418. The on-time can be controlled by monitoring input voltage $V_{IN}$ 402, output voltage $V_{OUT}$ 410, sense voltage $V_A$ 418, and the feedback voltage $F_B$ 420. FIG. 5 illustrates how these signals are used to produce variable on-time control according to an embodiment of the present invention. In the system shown in FIG. 5, the on time of the power converter switching element is controlled by a circuit having two primary functional blocks: (1) a minimum off-time generator portion 502, and (2) a variable on-time generator portion 504. The operation of the circuit shown in FIG. 5 will now be described.

The circuit of FIG. 5 operates in conjunction with the one shown in FIG. 4, and matching signal labels between the two figures refer to the same signal. The gate output 412 of the D-Q flip flop 506 drives the switching MOSFET 408 in the power converter depicted in FIG. 4. In FIG. 5, it can be seen that the minimum off-time circuit 502 is wired to the preset pin of the D-Q flip flop 506 such that it can drive the gate output 412 high to turn on the switching MOSFET 408. On the other hand, the variable on-time generator circuit 504 is wired to the clear pin of the D-Q flip flop 506 and thus can drive the gate output 412 low, turning off the switching MOSFET 408.

In the initial state, assume that the switching FET has just turned off such that the gate output of flip flop 506 is low, and the Q-bar output 508 is high. This produces a low output from inverter 510, which opens switch 512. This causes capacitor 514 to begin to charge from current source 516. As long as the voltage on the capacitor 514 remains below a reference voltage Vref, the output of comparator 518 remains high. Since the Q-bar output 508 is high and forms the other input to AND gate 520, the output of the AND gate 520 is high. Thus, OR gate 522 is controlled by the minimum off-time generator circuit and continue to drive a high output, regardless of the output of error amplifier 524. In other words, the minimum off-time generator overrides the error amplifier 524 and maintains the switching MOSFET 408 in an off state for a minimum time duration equal to the time it takes to charge capacitor 514 up to the level of Vref.

Once the capacitor 514 charges to the level of Vref, the comparator 518 switches low, causing AND gate 520 to switch low. The output of the OR gate 522 is then controlled by the error amplifier 524. The error amplifier compares the feedback voltage FB, measured at node 420 in FIG. 4, to the reference voltage Vref, in order to decide whether to switch on or off the MOSFET 408. Thus, without considering the variable on-time portion of the circuit 504, the switching FET is controlled by a standard error feedback loop with the modification, in accordance with an embodiment of the present invention, that whenever it switches off, it stays off for a minimum time equal to the time it takes to charge up capacitor 514 from current source 516. Current source 516 may be implemented as a resistor in series with the input voltage $V_{IN}$.

The variable on-time portion of the circuit 504 adds an additional control mechanism that depends on $V_A$, shown in FIG. 4 as element 418. From FIG. 4, it can be seen that $V_A$ is a voltage proportional to the load current being delivered by the switching converter. In a conventional device, as the load current drops, the switching frequency may drop into the audible range (below about 25 kHz) which is undesirable in many applications. Accordingly, the variable on-time circuit operates to prevent the switching frequency from dropping excessively under light loads.

Assume the switching MOSFET 408 (see FIG. 4) has just turned on. This means that in FIG. 5, the Q output of D-Q flip flop 506 is high and the Q-bar output 508 is low. The Q output drives inverter 526, so its output is low, opening switch 528. This causes capacitor 530 to charge from the input voltage $V_{IN}$ through resistor 544. Ignoring the circuitry connected at node 534 for the moment, when capacitor 530 has charged up to a voltage that is greater than the reference voltage Vref, comparator 532 changes state and drives high. Both inputs to AND gate 536 are thus high, and its output drives the clear input of D-Q flip flop 506, clearing the Q output and thus turning off the switching MOSFET. The operation described thus far with respect to the variable on-time circuit 504 reflects the traditional operation of an on-time control circuit in a switching power converter.

The additional control paths represented by the circuitry connected to node 534 enable variable on-time control and represent an embodiment in accordance with an aspect of the present invention. First, amplifier 538 is configured to provide on-time control that depends on the load current of the power converter. $V_A$ is proportional to the load current of the power converter, as can be seen from FIG. 4. In FIG. 5, amplifier 538 is configured as a differential amplifier that compares scaled versions of $V_A$, proportional to the load current, and $V_{OUT}$, the output voltage of the switching converter. As the output load current of the device increases, the output of amplifier 538 acts to enable current flow through a transconductance amplifier 540, also called a gm amplifier, which draws off current that would otherwise be charging capacitor 530. This slows the charge slew rate of capacitor 530, thus prolonging the on-time of the main switching MOS-FET 408. The transconductance amplifier 540 sinks a current that is proportional to its input voltage from amplifier 538. As shown in FIG. 5, it may be a MOSFET, although other implementations would also fall within the scope of the present invention. By properly selecting the charging current and/or the value of the capacitor 530, the on-time of the main switching MOSFET 408 can be adjusted around a nominal value.

A second transconductance amplifier 542 supplies an additional variable on-time control function. As the output voltage, $V_{OUT}$, of the power converter rises, transconductance amplifier 542 begins to conduct, providing an additional current path, sinking current that would otherwise be charging capacitor 530. Thus, the path represented by the second transconductance amplifier 542 also serves to slow the charging slew rate and thus prolong the on time of the main switching MOSFET 408 as the output voltage of the switching converter rises. Again, by properly selecting the charging current and/or the value of the capacitor 530, the on-time of the main switching MOSFET 408 can be adjusted around a nominal value.

Although FIG. 5 depicts both a first and second variable on-time control circuit, as described above, it is also possible to use only the first or only the second transconductance amplifier, depending on the particular application.

These variable on-time control mechanisms thus automatically provide low power consumption and low ripple noise under light-load and low-load conditions and also maintain a relatively high switching frequency that remains above the audible range, i.e., above about 25 kHz.

Figure 6:
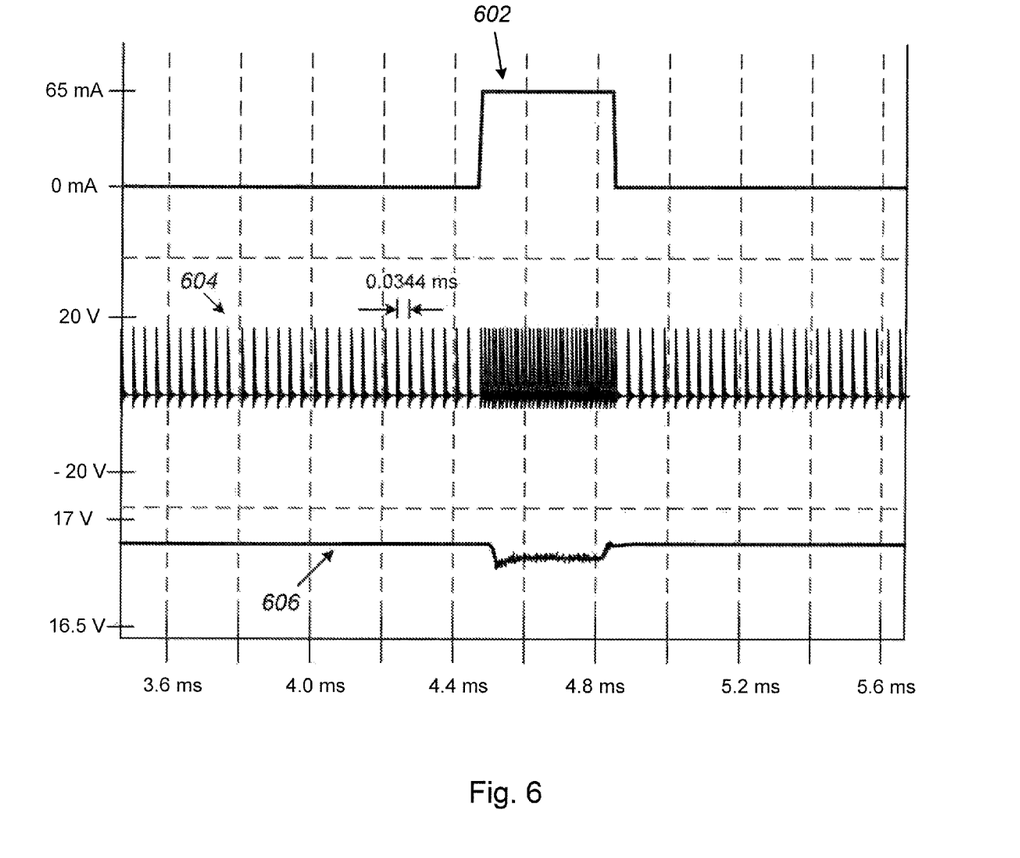
FIG. 6 is a simulated waveform at various nodes of a boost converter in accordance with an embodiment of the present invention, illustrating that the switching frequency remains above 25 kHz under no-load conditions.

FIG. 6 presents simulation results of the circuits shown in FIGS. 4 and 5, operating with a $V_{IN}$ of 3.3 V, a $V_{OUT}$ of 16.8 V, and a minimum off time of 350 ns. The topmost trace 602 shows the load current of the switching converter, switching from 0 mA to 65 mA at about the 4.5 ms mark and remaining there until about the 4.85 ms mark, and then returning to 0 mA.

The second trace from the top, labeled 604, is the voltage measured at the phase node (element 422 in FIG. 4), and the bottom trace 606 is the output voltage, $V_{OUT}$. It can be seen that when the load current is at zero, the switching period in this example is 0.0344 ms, which corresponds to a frequency of 29 kHz, which is above 25 kHz and thus beyond the audible range.

The basic equations that ensure this type of operating condition is maintained with low output current or no output current are the energy balance equations. In a boost converter, such as that shown in FIG. 4, $E_p(D_1)$ represents the total energy stored in the inductor that is transferred during the on time of the switching MOSFET 408. The on time is given by $T_{ON}=D_1*T_S$, where $D_1$ is the fractional duty cycle of the MOSFET, and $T_S$ is the switching period. $E_n(D_1)$ represents the total energy stored in the output capacitor and dissipated in the circuit during the off time. The off time is given by $T_{OFF}=(1-D_1)*T_S$, where $1-D_1$ represents the off duty cycle. The condition ensuring that the converter will operate at a constant switching frequency ($1/T_S$) that is greater than 25 kHz is given by:

$$E_p(D_1) \leq E_n(D_1).$$

Figure 7:
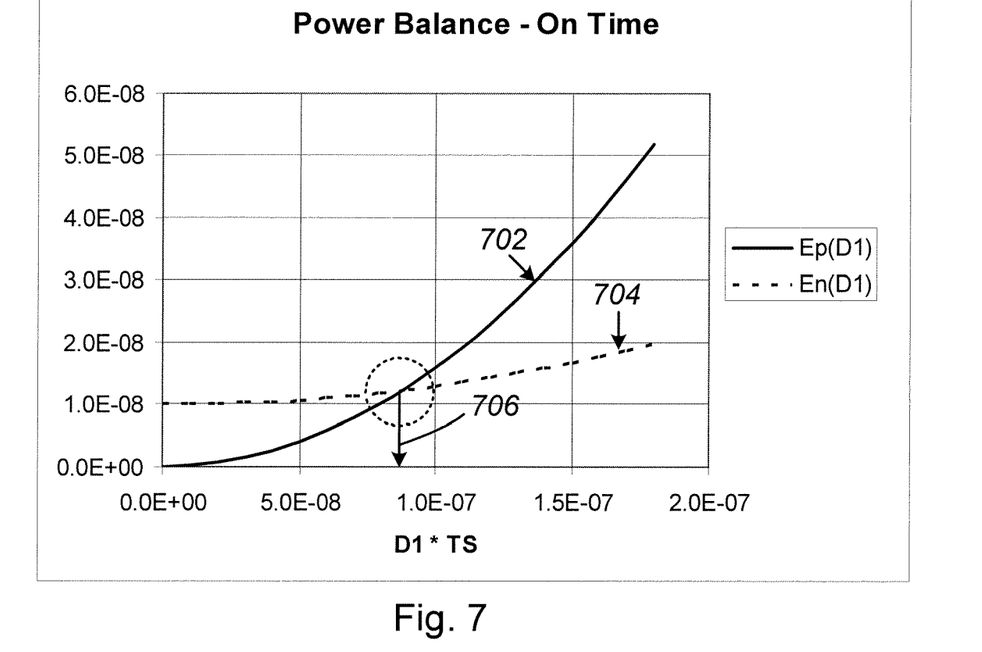
FIG. 7 is a graphical representation of the required power balance conditions plotted as a function of on time.
Figure 8:
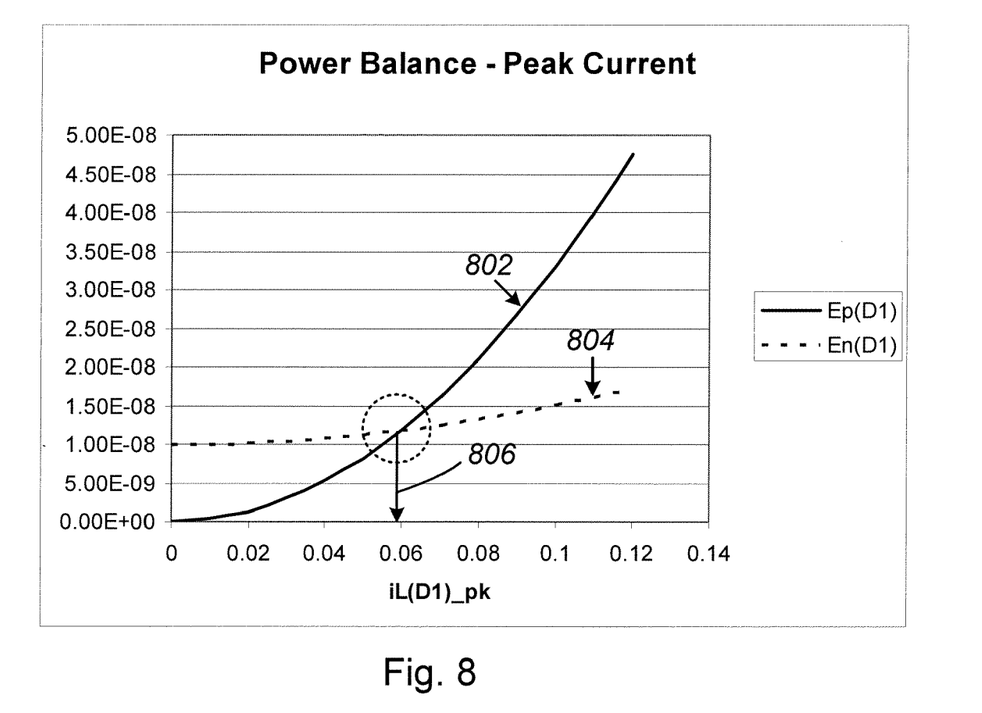
FIG. 8 is a graphical representation of the same power balance conditions plotted as a function of peak inductor current.

FIGS. 7 and 8 show how this condition can be met for the boost converter example discussed above with reference to FIG. 6. FIG. 7 is a plot of the total on-time inductor energy $E_p(D_1)$ 702 and the total off-time capacitor energy $E_n(D_1)$ 704 as a function of the total on time. From the plot, it can be seen that the condition above is satisfied in the left-hand portion of the plot, where $D_1$ is below a critical value $D_{1\_crit}$, shown graphically at 706.

FIG. 8 shows an alternative method of representing this condition by plotting the total on-time inductor energy $E_p(D_1)$ 802 and the total off-time capacitor energy $E_n(D_1)$ 804 as a function of the peak current $i_L(D_1)\_pk$ through the inductor. In this case, it is evident that the condition above, required for keeping the switching frequency greater than about 25 kHz, is satisfied as long as the peak inductor current is kept below a critical value $i_L\_crit$, shown graphically at 806.

In other words, for the boost converter discussed in relation to FIG. 6, there is a region of operation in which the boost circuit will operate at a frequency greater than 25 kHz. This region is that having $T_{ON}$ between zero and $D_1\_crit*T_S$. Alternatively, it is the region having peak inductor current between 0 and $i_L\_crit$. Indeed these two conditions are related as follows:

$$i_L(D_1)\_pk=(V_{IN}/L)*T_{ON}=(V_{IN}/L)*D_1*T_S.$$

Here, L represents the inductance value of the inductor. Importantly, this equation makes it clear that in order to achieve the minimum switching frequency conditions, the peak current through the inductor must be limited to a value between zero and $i_L\_crit$.

While the above discussion has focused on an exemplary architecture for a boost-type converter, the inventive features are similarly applicable to other switching converter topologies such as buck-type converters, buck-boost converters, single-ended primary inductor (SEPIC) converters, or other switching power converter designs. In light of the preceding discussion, one skilled in the art will readily appreciate other applications and advantages of the invention, and such applications would also fall within the scope and spirit of the present invention. The invention is solely defined by the following claims.

What is claimed is:

1. For controlling a switching power converter having a primary switching element, an input voltage, an output voltage, and a load current, a variable on-time generator comprises:
   a primary feedback circuit comprising:
      a charge storage device connected in parallel with a bypass switch to a current source whereby the current source charges the charge storage device when the bypass switch is opened; and
      a comparison circuit connected to the charge storage device and to a reference voltage and having an output that changes state when the charge storage device reaches a voltage that is greater than the reference voltage;
         wherein the output of the comparison circuit is configured to control the primary switching element of the switching power converter; and
   at least one of a first variable control circuit and a second variable control circuit, wherein:
      the first variable control circuit comprises:
         a differential amplifier configured to compare the load current and the output voltage of the switching power converter; and
         a first transconductance amplifier connected to the current source of the primary feedback circuit and configured to shunt a portion of the current from the current source in response to an output of the differential amplifier of the first variable control circuit; and
      wherein the second variable control circuit comprises:
         a second transconductance amplifier connected to the current source of the primary feedback circuit and configured to shunt a portion of the current from the current source wherein the portion is dependent on the output voltage of the switching power converter.

2. The variable on-time generator of claim 1, wherein:
   the charge storage device of the primary feedback circuit comprises a capacitor; and
   the current source of the primary feedback circuit comprises a resistor in series with the input voltage of the switching power converter.

3. The variable on-time generator of claim 1, wherein at least one of the first transconductance amplifier and the second transconductance amplifier comprises a MOSFET.

4. The variable on-time generator of claim 1 including both the first variable control circuit and the second variable control circuit.

5. The variable on-time generator of claim 1, further operatively coupled to a minimum-off-time circuit comprising:
   a second charge storage device connected in parallel with a second bypass switch to a second current source, whereby the second current source charges the second charge storage device when the second bypass switch is opened;
   a second comparison circuit connected to the second charge storage device and to the reference voltage and having an output that changes state when the second charge storage device reaches a voltage that is greater than the reference voltage;
      wherein the output of the comparison circuit is configured to prevent the primary switching element of the switching power converter from turning on until the output of the second comparison circuit changes state.

6. The variable on-time generator of claim 5, wherein:
   the second charge storage device of the minimum-off-time circuit comprises a capacitor; and
   the second current source of the minimum-off-time circuit comprises a resistor in series with the input voltage of the switching power converter.

7. A switching power converter receiving an input voltage and supplying a load current at an output voltage and comprising:
   a primary switching element; and
   a variable on-time control circuit operatively coupled to the primary switching element and comprising:
      a primary feedback circuit comprising:
         a charge storage device connected in parallel with a bypass switch to a current source whereby the current source charges the charge storage device when the bypass switch is opened; and
         a comparison circuit connected to the charge storage device and to a reference voltage and having an output that changes state when the charge storage device reaches a voltage that is greater than the reference voltage;
            wherein the output of the comparison circuit is configured to control the primary switching element of the switching power converter; and
      at least one of a first variable control circuit and a second variable control circuit, wherein:
         the first variable control circuit comprises:
            a differential amplifier configured to compare the load current and the output voltage of the switching power converter; and
            a first transconductance amplifier connected to the current source of the primary feedback circuit and configured to shunt a portion of the current from the current source in response to an output of the differential amplifier of the first variable control circuit; and wherein the second variable control circuit comprises:
a second transconductance amplifier connected to the current source of the primary feedback circuit and configured to shunt a portion of the current from the current source wherein the portion is dependent on the output voltage of the switching power converter.

8. The switching power converter of claim 7, wherein the switching power converter comprises one of a boost converter, a buck converter, a buck-boost converter, and a single-ended primary inductor (SEPIC) converter.

9. The switching power converter of claim 7, wherein:
the charge storage device of the primary feedback circuit comprises a capacitor; and
the current source of the primary feedback circuit comprises a resistor in series with the input voltage of the switching power converter.

10. The switching power converter of claim 7, wherein at least one of the first transconductance amplifier and the second transconductance amplifier comprises a MOSFET.

11. The switching power converter of claim 7 including both the first variable control circuit and the second variable control circuit.

12. The switching power converter of claim 7, further operatively coupled to a minimum-off-time circuit comprising:
a second charge storage device connected in parallel with a second bypass switch to a second current source, whereby the second current source charges the second charge storage device when the second bypass switch is opened;
a second comparison circuit connected to the second charge storage device and to the reference voltage and having an output that changes state when the second charge storage device reaches a voltage that is greater than the reference voltage;
wherein the output of the comparison circuit is configured to prevent the primary switching element of the switching power converter from turning on until the output of the second comparison circuit changes state.

13. The switching power converter of claim 12, wherein:
the second charge storage device of the minimum-off-time circuit comprises a capacitor; and
the second current source of the minimum-off-time circuit comprises a resistor in series with the input voltage of the switching power converter.

* * * * *